United States Patent [19]
Budnik et al.

[11] Patent Number: 6,052,064
[45] Date of Patent: Apr. 18, 2000

[54] METHOD AND APPARATUS IN A WIRELESS MESSAGING SYSTEM FOR DYNAMIC CREATION OF DIRECTED SIMULCAST ZONES

[75] Inventors: Brian Joseph Budnik, Watauga; Donald Bryan Siperko, Fort Worth, both of Tex.

[73] Assignee: Motorola, Inc., Schaumburg, Ill.

[21] Appl. No.: 08/960,814

[22] Filed: Oct. 30, 1997

[51] Int. Cl.⁷ ............................................. G08B 5/22
[52] U.S. Cl. ........................... 340/825.44; 455/38.1; 455/440; 455/435; 455/502
[58] Field of Search ................. 340/825.44; 455/38.1, 455/435, 552, 502, 503, 456, 512, 440

[56] References Cited

U.S. PATENT DOCUMENTS

| | | | |
|---|---|---|---|
| 4,875,038 | 10/1989 | Siwiak et al. | 340/825.44 |
| 4,918,437 | 4/1990 | Jasinski et al. | 340/825.44 |
| 4,968,966 | 11/1990 | Jasinski et al. | 340/825.44 |
| 5,423,063 | 6/1995 | Goldberg | 455/503 |
| 5,485,632 | 1/1996 | Ng et al. | 455/503 |
| 5,530,918 | 6/1996 | Jasinski | 340/825.44 |
| 5,666,651 | 9/1997 | Wang | 455/512 |
| 5,706,331 | 1/1998 | Wang et al. | 455/552 |
| 5,732,358 | 3/1998 | Sawaya et al. | 455/456 |
| 5,790,953 | 8/1998 | Wang et al. | 455/435 |

*Primary Examiner*—Brian Zimmerman
*Assistant Examiner*—Yves Dalencourt
*Attorney, Agent, or Firm*—R. Louis Breeden

[57] ABSTRACT

Base transmitters (116) of a wireless messaging system are pre-programmed (802) with location identifiers (216) for identifying the positions at which the base transmitters are located. In response to an inbound message from a portable subscriber unit (122), a fixed portion (102) of the wireless messaging system makes an estimate (808) of a location at which the portable subscriber unit is positioned. A controller (112) sends (812) an outbound message (614) and the estimate to the base transmitters, and the base transmitters calculate (812) distances between themselves and the portable subscriber unit, based upon the location identifiers and the estimate. In addition, the base transmitters independently make a decision (818) whether to transmit the outbound message, based upon a comparison of a predetermined rule with the distance of the base transmitter from the portable subscriber unit.

19 Claims, 4 Drawing Sheets

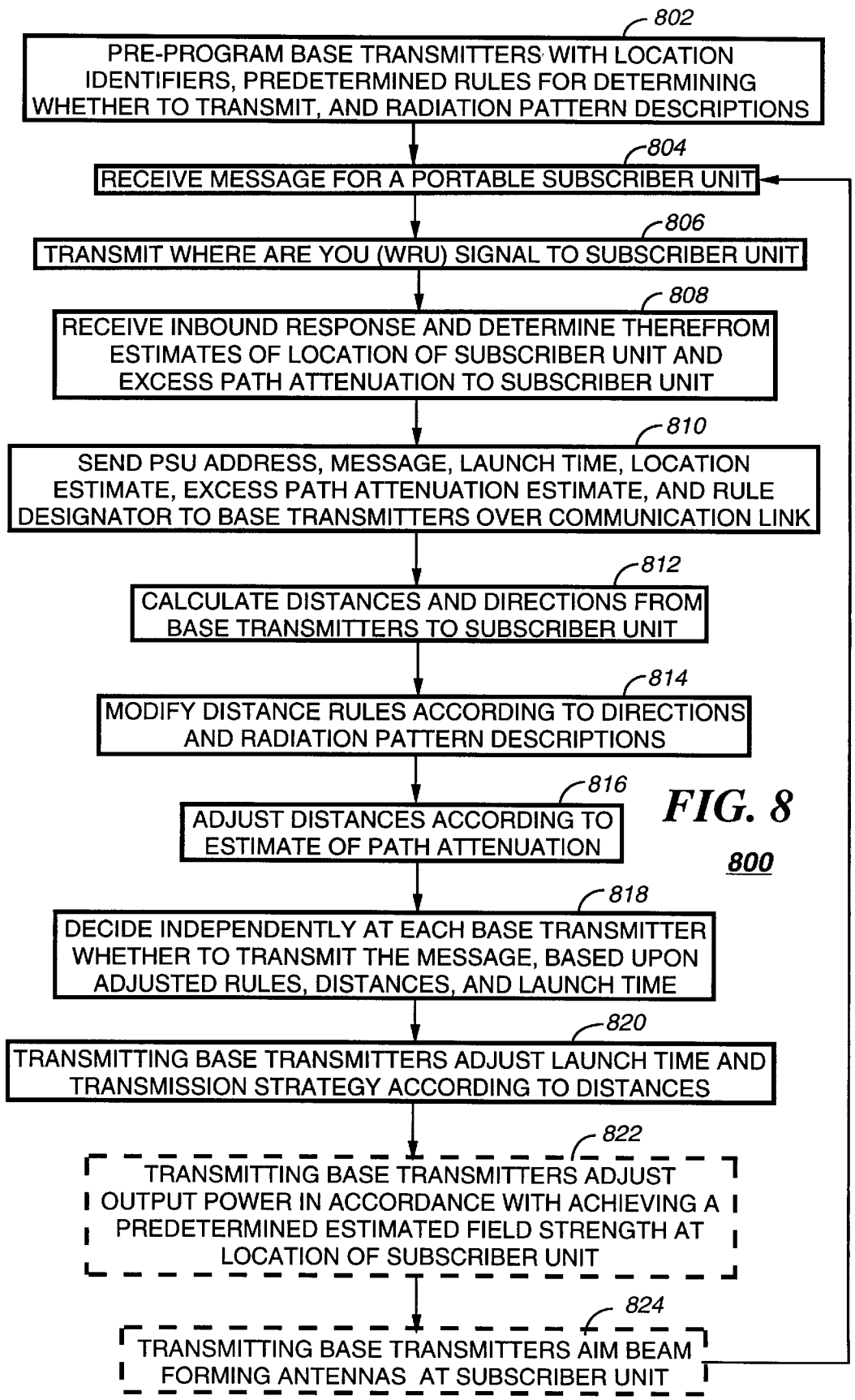

METHOD AND APPARATUS IN A WIRELESS MESSAGING SYSTEM FOR DYNAMIC CREATION OF DIRECTED SIMULCAST ZONES

FIELD OF THE INVENTION

This invention relates in general to wireless messaging systems, and more specifically to a method and apparatus in a wireless messaging system for dynamic creation of directed simulcast zones.

BACKGROUND OF THE INVENTION

Simulcast transmission in wireless messaging systems is frequently utilized for coverage of large areas and to enhance the reliability of message delivery. An objective of simulcast transmission is to transmit multiple signals from multiple transmitters such that the information carried by the multiple signals arrives in synchronism at a receiver. In general, synchronism has been attempted with some success in prior art systems by adjusting either a delay or a launch time of the multiple transmitters such that the information leaves the transmitters substantially simultaneously.

Modern two-way messaging systems have made it possible to determine the location of subscriber units operating in the system. This also makes it possible to perform multiple directed simulcast transmissions using small, isolated clusters of cells, thereby allowing frequency reuse.

While frequency reuse is highly desirable, coordination of the multiple directed simulcast transmissions adds significantly to the processing burden of the messaging system controllers. Another problem that can occur during any simulcast transmission is delay spread. Delay spread occurs when a receiver is not equidistant from two or more simulcasting transmitters and is caused by differential transmission delay resulting from the unequal path lengths between the receiver and the transmitters. Delay spread limits the maximum possible symbol rate that can be utilized in a simulcast system, thereby limiting throughput.

Thus, what is needed is a method and apparatus in a wireless messaging system that can facilitate the dynamic creation of directed simulcast zones without adding significantly to the processing burden of the messaging system controllers. The method and apparatus preferably also will reduce delay spread in a simulcast system.

SUMMARY OF THE INVENTION

An aspect of the present invention is a method in a wireless messaging system for dynamic creation of simulcast zones optimized for transmission of an outbound message from a plurality of base transmitters to a portable subscriber unit. The method comprises the steps of pre-programming the plurality of base transmitters with a corresponding plurality of location identifiers for identifying a plurality of positions at which the plurality of base transmitters are located; and determining, by a fixed portion of the wireless messaging system in response to an inbound message from the portable subscriber unit, an estimate of a location at which the portable subscriber unit is positioned. The method further comprises the steps of sending the outbound message and the estimate from a controller to the plurality of base transmitters, and calculating by the plurality of base transmitters a plurality of distances between the plurality of base transmitters and the portable subscriber unit, based upon the plurality of location identifiers and the estimate. In addition, the method includes the step of independently making a decision by a base transmitter of the plurality of base transmitters of whether to transmit the outbound message, based upon a comparison of a predetermined rule with a distance of the plurality of distances, the distance being that between the base transmitter and the portable subscriber unit.

Another aspect of the present invention is a base transmitter in a wireless messaging system for dynamic creation of simulcast zones optimized for transmission of an outbound message from a plurality of base transmitters to a portable subscriber unit. The base transmitter comprises a transmitter for transmitting the outbound message, a processing system coupled to the transmitter for processing the outbound message, and a controller interface coupled to the processing system for communicating with a controller. The processing system comprises a memory for pre-programming the base transmitter with a location identifier for identifying a position at which the base transmitter is located. The processing system is programmed to cooperate with the controller interface to receive from the controller the outbound message and an estimate of a location at which the portable subscriber unit is positioned, and to calculate a distance between the base transmitter and the portable subscriber unit, based upon the location identifier and the estimate. The processing system is further programmed to independently make a decision of whether to transmit the outbound message, based upon a comparison of a predetermined rule with the distance.

Another aspect of the present invention is a controller in a wireless messaging system for dynamic creation of simulcast zones optimized for transmission of an outbound message from a plurality of base transmitters to a portable subscriber unit. The controller comprises a network interface for receiving an outbound message, a processing system coupled to the network interface for processing the outbound message, and a base transmitter/receiver interface coupled to the processing system for communicating with the plurality of base transmitters and with a plurality of base receivers. The processing system is programmed to pre-program the plurality of base transmitters with a corresponding plurality of location identifiers for identifying a plurality of positions at which the plurality of base transmitters are located. The processing system is further programmed to determine, in cooperation with ones of the plurality of base receivers, in response to an inbound message from the portable subscriber unit, an estimate of a location at which the portable subscriber unit is positioned. The processing system is also programmed to send the outbound message and the estimate to the plurality of base transmitters.

BRIEF DESCRIPTION OF THE DRAWINGS

FIG. 8 is an exemplary flow chart depicting operation of a fixed portion of the wireless messaging system in accordance with the present invention.

DETAILED DESCRIPTION OF THE DRAWINGS

Figure 1:
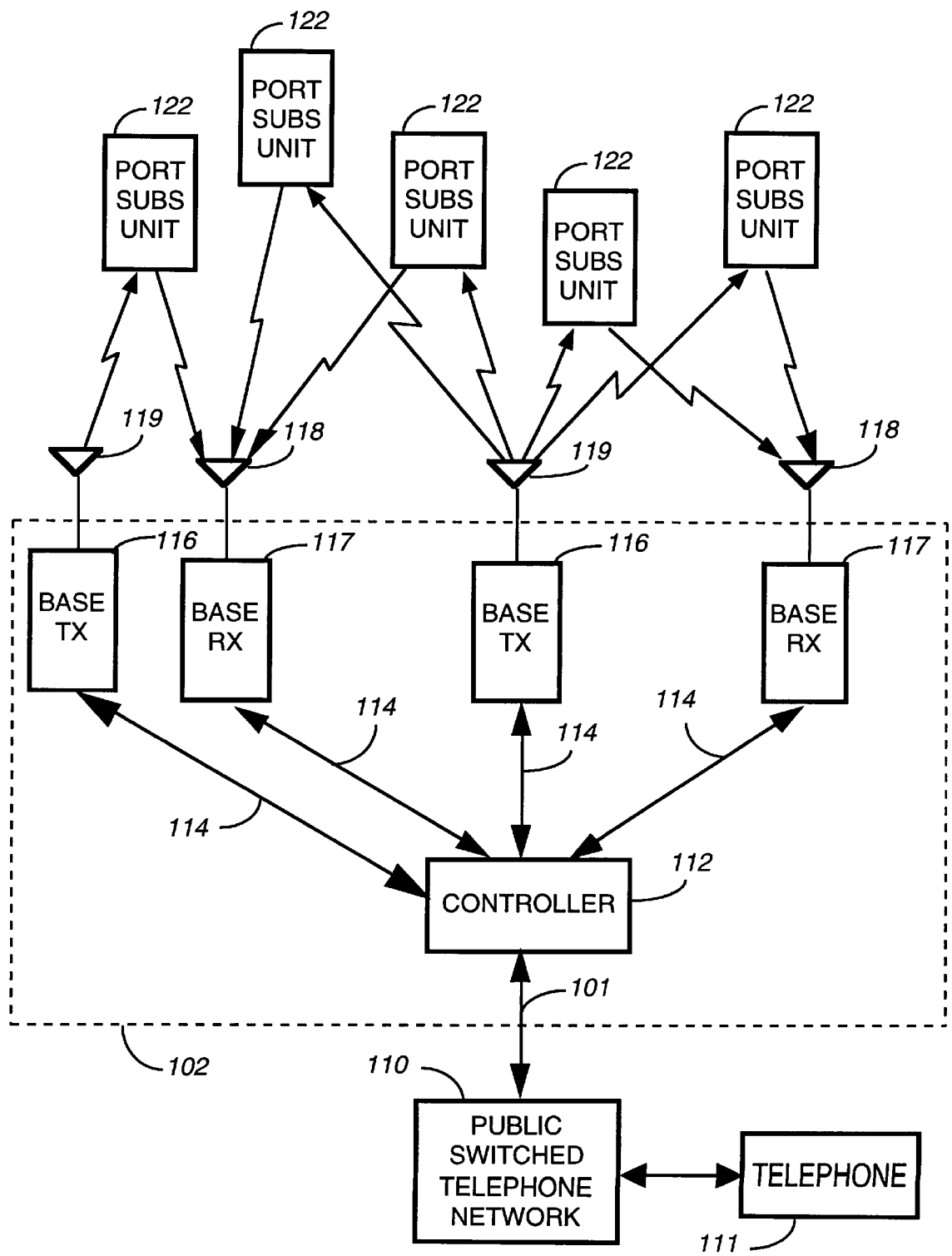
FIG. 1 is an electrical block diagram of an exemplary wireless messaging system in accordance with the present invention.

Referring to FIG. 1, an electrical block diagram of an exemplary wireless messaging system in accordance with the present invention comprises a fixed portion 102 including a controller 112, a plurality of base transmitters 116, and a plurality of base receivers 117. The wireless messaging system further comprises a portable portion including a plurality of portable subscriber units 122, preferably having acknowledge-back capability. The base transmitters 116 are used for sending outbound messages to the portable subscriber units 122 utilizing conventional radio frequency (RF) techniques, and are coupled by communication links 114 to the controller 112, which controls the base transmitters 116. The base receivers 117 are used for receiving an inbound message from a portable subscriber unit 122, and each base receiver 117 preferably includes a conventional received signal strength indicator (RSSI) for determining the signal strength of the inbound message. It will be appreciated that the base receivers 117 and the base transmitters 116 can be collocated at some sites and physically separated at other sites in the system. It will be further appreciated that the quantity of base receivers 117 and base transmitters 116 can differ in a given system, more base receivers than base transmitters being the norm.

The hardware of the controller 112 is preferably a combination of the Wireless Messaging Gateway (WMG™) Administrator! paging terminal, and the RF-Conductor!™ message distributor manufactured by Motorola, Inc. The hardware of the base transmitters 116 is preferably similar to the RF-Orchestra!™ transmitter manufactured by Motorola, Inc. The base receivers 117 are preferably conventional RF-Audience!™ receivers manufactured by Motorola, Inc. The portable subscriber units 122 are preferably conventional Tenor™ voice messaging units and Pagefinder™ data messaging units, also manufactured by Motorola, Inc. It will be appreciated that other similar hardware can be utilized as well for the controller 112, the base transmitters 116, the base receivers 117, and the portable subscriber units 122.

Each of the base transmitters 116 transmits RF signals to the portable subscriber units 122 via a transmitter antenna 119. The base receivers 117 each receive RF signals from ones of the plurality of portable subscriber units 122 via a receiver antenna 118. The RF signals transmitted by the base transmitters 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base receivers 117 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The controller 112 and the base transmitters 116 preferably communicate with each other by utilizing a conventional link protocol, e.g., Motorola's SuperStream™ protocol, including minor modifications easily accomplished by one of ordinary skill in the art for sending additional information in accordance with the present invention, as described further herein below. The protocol utilized for wireless outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
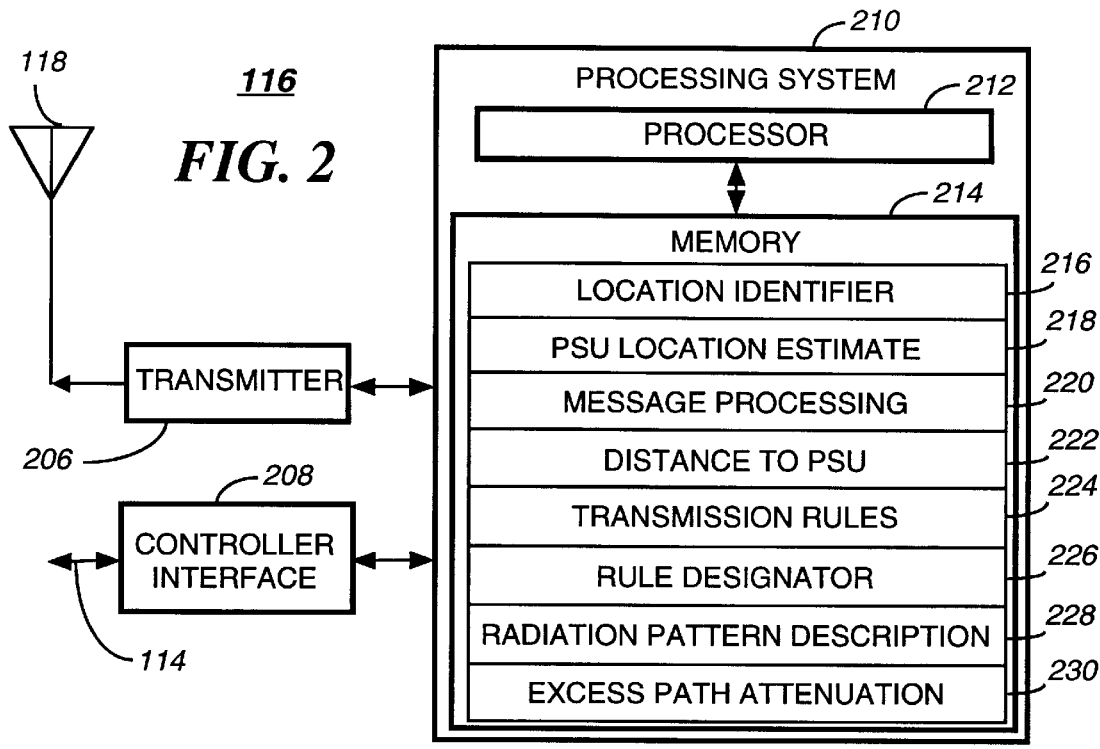
FIG. 2 is an electrical block diagram of an exemplary base transmitter in accordance with the present invention.

FIG. 2 is a simplified electrical block diagram of an exemplary base transmitter 116 in accordance with the present invention. The base transmitter 116 includes a processing system 210, a conventional controller interface 208, a conventional transmitter 206, and the transmitter antenna 119. It will be appreciated that the transmitter antenna 119 can be a conventional electronically steerable beam-forming antenna that can be aimed at the portable subscriber unit 122, as described further below.

The processing system 210 is used for directing operations of the base transmitter 116. The processing system 210 preferably is coupled to the transmitter 206 for control thereof and communication therewith. The transmitter 206 is coupled to the transmitter antenna 119 for emitting a radio signal therefrom. The processing system 210 is further coupled to the controller interface 208 for communicating with the controller 112 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few.

In order to perform the functions necessary for directing operations of the base transmitter 116, the processing system 210 preferably includes a conventional processor 212, and a conventional memory 214. The memory 214 includes locations for storing variables and software elements for programming the processing system 210 in accordance with the present invention. The memory 214 comprises a location identifier 216 pre-programmed into the base transmitter 116 for identifying the location of the base transmitter 116. Preferably, the location identifier 216 comprises a set of Cartesian coordinates which identify the location of the base transmitter 116. The location identifier 216 preferably is communicated from the controller 112 to the base transmitter 116 via the communication link 114, using well-known techniques. It will be appreciated that, alternatively, the base transmitter 116 can include a Global Positioning Satellite (GPS) receiver from which the base transmitter 116 can determined its own location identifier coordinates.

The memory 214 further comprises a PSU location estimate 218, preferably comprising a set of Cartesian coordinates defining the estimated position of a portable subscriber unit that has responded with an inbound message to the fixed portion 102 of the wireless messaging system. The location estimate 218 preferably is determined by the controller 112 in cooperation with the base receivers 117 using well-known techniques, such as comparing RSSI levels of a plurality of base receivers 117 during receipt of the inbound message. It will be appreciated that, alternatively, other well-known locating techniques, e.g., triangulation, spread spectrum, or GPS techniques, to name a few, can be used as well to estimate the position of the portable subscriber unit 122. After determining the PSU location estimate 218, the controller 112 communicates the PSU location estimate 218 along with the outbound message to the base transmitters 116.

The memory 214 also includes a message processing element 220 for processing the outbound message, and further includes a distance 222 to the portable subscriber unit 122. The distance 222 is computed by the base transmitter 116 from the coordinates of the location identifier 216 and those of the PSU location estimate 218. The memory 214 further comprises transmission rules 224, preferably communicated from the controller 112. In addition, the memory 214 includes a rule designator 226 communicated from the controller 112 for designating which of the transmission rules 224 is/are currently applicable. A radiation pattern description 228 is also preferably included for describing the relative radiation effectiveness pattern of the base transmitter 116 in a plurality of directions from the base transmitter 116. The memory 214 further comprises an excess path attenuation 230 communicated from the controller 112 with the outbound message for estimating excess path attenuation affecting the portable subscriber unit 122. The excess path attenuation 230 is computed by the fixed portion 102 and communicated from the controller 112 to the base transmitters. The excess path attenuation 230 preferably represents excess attenuation over and above free-space attenuation due to distance. Excess path attenuation can be caused, for example, by a building structure surrounding the portable subscriber unit 122. The excess path attenuation 230 is computed from a free-space path attenuation corresponding to the estimated distance between the base receivers 117 receiving an inbound message and the sending portable subscriber unit 122, relative to the RSSI level measured by the base receivers 117 during reception, using well-known techniques. For example, if the estimated distance from a base receiver 117 is computed to produce a free-space RSSI level of −40 dB, and the measured RSSI level is −50 dB, then the excess path attenuation 230 is 10 dB for this base receiver 117. If other base receivers 117 also receive the inbound message, the excess path attenuation values preferably are averaged together by the controller 112 to obtain a single excess attenuation value for the portable subscriber unit 122. The excess path attenuation 230 advantageously can be utilized by the base transmitter 116 to set an optimum power level for reaching the portable subscriber unit 122 reliably without using excessive power.

Figure 3:
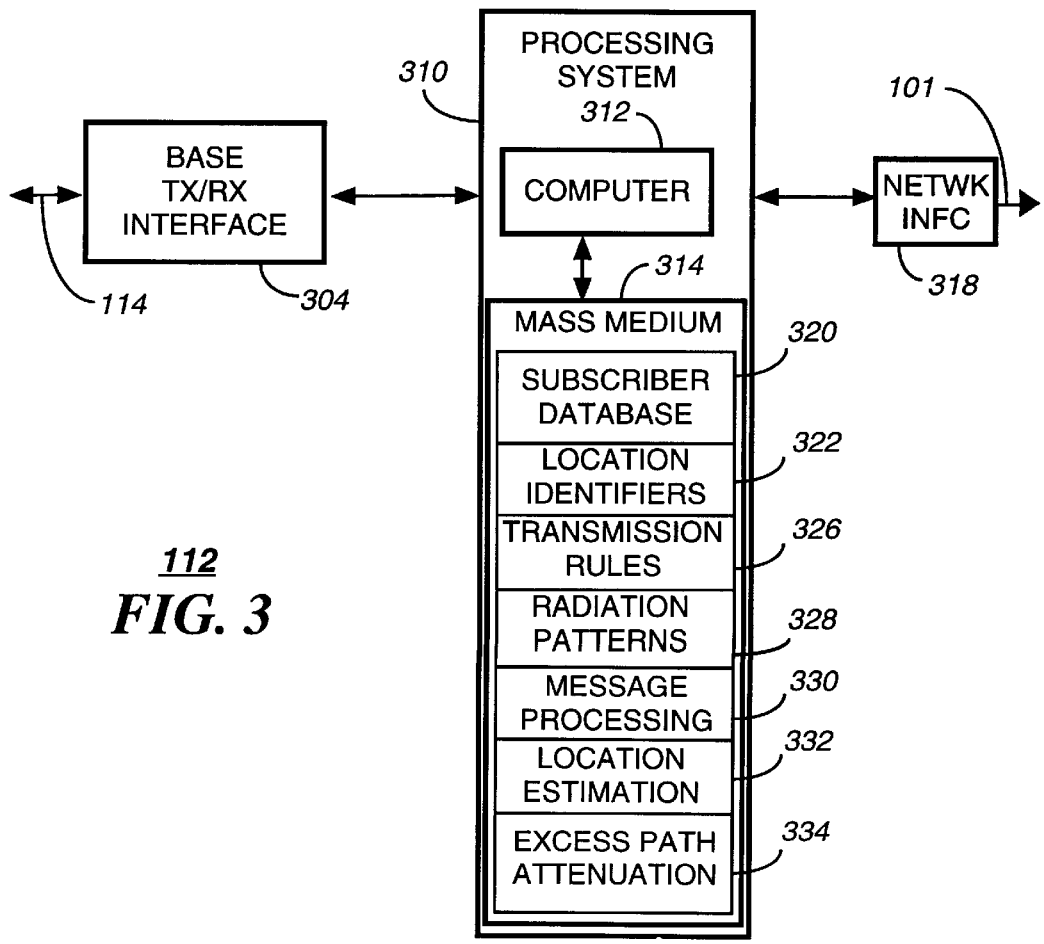
FIG. 3 is an electrical block diagram of an exemplary controller in accordance with the present invention.

FIG. 3 is an electrical block diagram of an exemplary controller 112 in accordance with the present invention. The controller 112 comprises a processing system 310 for executing the operations of the controller 112. The processing system 310 is coupled to a conventional network interface 318 for receiving messages through the telephone links 101. The processing system 310 is also coupled to a conventional base transmitter/receiver interface 304 for controlling and communicating with the base transmitters 116 through the communication link 114. It will be appreciated that more than one base transmitter/receiver interface 304 can be present, depending upon system size. The processing system 310 comprises a conventional computer 312 and a conventional mass storage medium 314. The mass storage medium 314 includes, for example, a subscriber database 320, comprising subscriber information such as addressing and programming options of the portable subscriber units 122.

The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes software and various databases utilized in accordance with the present invention. The mass storage medium 314 preferably includes location identifiers 322 corresponding to the base transmitters 116 for pre-programming the location identifier 216 of each base transmitter 116. Alternatively, the base transmitters 116 can be equipped with GPS receivers for establishing their own location identifier coordinates without help from the controller 112. The mass storage medium 314 further comprises transmission rules 326 with which to pre-program the base transmitters 116. In addition, the mass storage medium 314 preferably includes radiation patterns 328 with which to pre-program the radiation is pattern description 228 of each base transmitter 116. It will be appreciated that, alternatively, the radiation pattern information can be programmed directly into the base transmitters 116 at each site, with optional "back up" by up-loading the radiation pattern information to the controller 112 via the communication link 114. The mass storage medium 314 also includes a message processing element 330 for programming the processing system 210 to process inbound and outbound messages in accordance with the present invention. The mass storage medium 314 further comprises a location estimation element 332 for programming the processing system 310 to cooperate with the base transmitters 116 to estimate the location of a responding portable subscriber unit 122. In addition, the mass storage medium 314 includes an excess path attenuation element 334 for programming the processing system 310 to determine the excess path attenuation of a portable subscriber unit 122 as described herein above.

Figure 4:
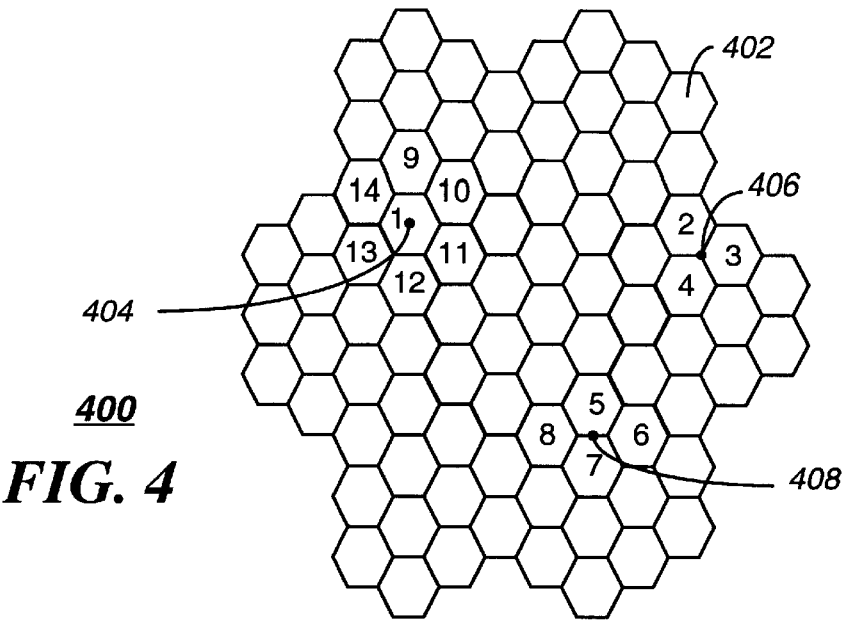
FIG. 4 is an exemplary coverage diagram of the wireless messaging system in accordance with the present invention.

FIG. 4 is an exemplary coverage diagram 400 of the wireless messaging system in accordance with the present invention. Each hexagonal cell 402 represents an idealized radio coverage area of a single base transmitter 116 at the center of the cell 402. For this example, assume that there are no outbound messages in the system that have duplicate launch times. In accordance with the present invention, if a first portable subscriber unit 122 has a pending outbound message and has been determined to be located near the center 404 of cell 1, the base transmitter 116 of cell 1 preferably will independently decide to transmit the outbound message, while all other base transmitters 116 will independently decide not to transmit the outbound message, based upon the distance to the first portable subscriber unit 122. It will be appreciated that, alternatively, depending upon the transmission rules 224 of the base transmitters 116, the base transmitters 116 of cell 1 and cells 9–14 can independently decide to transmit the outbound message, as well. If a second portable subscriber unit 122 has a pending outbound message and has been determined to be located near the intersection 406 of cells 2, 3, and 4, the base transmitters 116 of cells 2, 3, and 4 preferably will decide to transmit the outbound message, while all other base transmitters 116 will decide not to transmit the outbound message. If a third portable subscriber unit 122 has a pending outbound message and has been determined to be located near the center 408 of the intersection of cells 5 and 7, the base transmitters 116 of cells 5, 6, 7, and 8 preferably will decide to transmit the outbound message, while all other base transmitters 116 will decide not to transmit the outbound message. It will be appreciated that, based upon the specific transmission rules 224, larger or smaller groups of base transmitters 116 can participate in each transmission.

Figure 5:
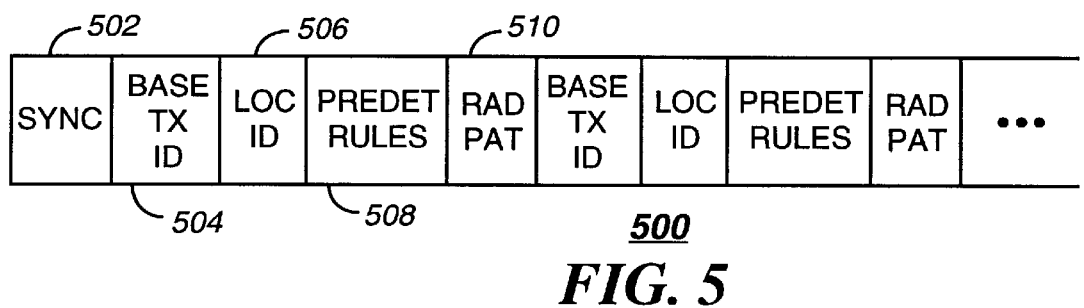
FIG. 5 is an exemplary protocol diagram depicting controller-to-base-transmitter messages for pre-programming the base transmitters in accordance with the present invention.

FIG. 5 is an exemplary protocol diagram 500 depicting controller-to-base-transmitter messages for pre-programming the base transmitters 116 through the communication links 114 in accordance with the present invention. The diagram 500 comprises a conventional synchronization portion 502 for synchronizing the link communications using well-known techniques. The diagram 500 further comprises a base transmitter identifier 504 for identifying the base transmitter 116 to which the pre-programming data is being sent. The pre-programming data includes a location identifier 506 for identifying the location of the base transmitter 116, preferably by Cartesian coordinates. The pre-programming data also includes predetermined rules 508, which the base transmitter 116 will use to decide whether to transmit an outbound message. In addition, the pre-programming data preferably includes a description of a radiation pattern 510 exhibited by the base transmitter 116. The radiation pattern 510 preferably is expressed in terms of antenna gain or loss in a plurality of directions, e.g., eight uniformly distributed directions, as affected by antenna directionality and nearby terrain features. Pre-programming information for additional base transmitters 116 can then follow in a similar manner.

Figure 6:
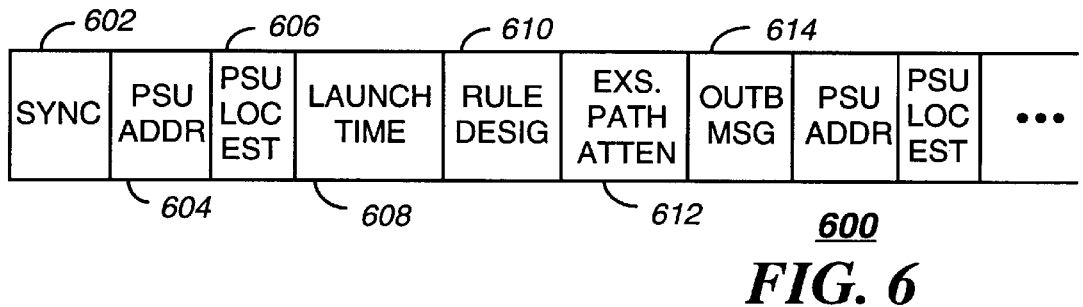
FIG. 6 is an exemplary protocol diagram depicting controller-to-base-transmitter messages for setting up the transmission of an outbound message in accordance with the present invention.

FIG. 6 is an exemplary protocol diagram 600 depicting controller-to-base-transmitter messages for setting up the transmission of an outbound message in accordance with the present invention. The diagram 600 begins with a conventional synchronization word 602 and includes an address for identifying the portable subscriber unit 122 to which the outbound message is to be sent. The diagram 600 further comprises a location estimate 606 for the portable subscriber unit 122, as determined by the fixed portion 102. In addition, the diagram 600 includes a launch time 608 specifying the time at which the base transmitter 116 is to begin transmitting the outbound message. The diagram 600 preferably further comprises a transmission rule designator 610 for designating which of the pre-programmed transmission rules apply to the outbound message. In addition, the diagram 600 preferably includes an excess path attenuation value 612 for specifying any excess path attenuation that exists for the portable subscriber unit 122, as discussed herein above. The diagram 600 further includes the outbound message 614 to be sent to the portable subscriber unit 122. Additional outbound set-up messages can then follow in a similar manner.

Figure 7:
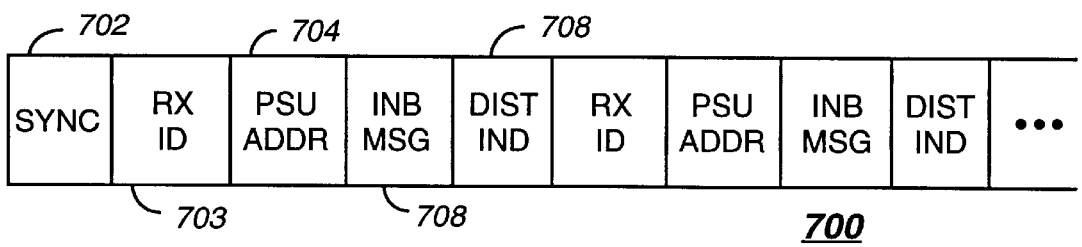
FIG. 7 is an exemplary protocol diagram depicting base-receiver-to-controller messages for reporting the receipt of an inbound message in accordance with the present invention.

FIG. 7 is an exemplary protocol diagram 700 depicting base-receiver-to-controller messages for reporting the receipt of an inbound message in accordance with the present invention. The diagram 700 comprises a conventional synchronization word 702, followed by the base receiver identification 703, followed by the address 704 of the portable subscriber unit 122. The inbound message 706 is also included, along with a distance indicator 708. The distance indicator 708 preferably is an RSSI value indicative of the average signal strength of the inbound message at the base receiver 117. It will be appreciated that, alternatively, another distance indicator determined through any of a number of well-known distance measurement techniques can be utilized as well. Additional inbound message receipt messages can then follow in a similar manner.

FIG. 8 is an exemplary flow chart 800 depicting operation of a fixed portion of the wireless messaging system in accordance with the present invention. First, the base transmitters 116 are pre-programmed 802 with the location identifiers 216, the predetermined transmission rules 224, and the radiation pattern descriptions 228. Next, a message is received 804 by the controller 112 for a portable subscriber unit 122. In response, the controller 112 preferably controls the base transmitters 116 to transmit 806 a Where aRe yoU (WRU) message, which is a request for an inbound message response, to the portable subscriber unit 122, preferably in the coverage zone where the portable subscriber unit 122 last registered. Alternatively, the controller can rely on previously received and stored location information about the portable subscriber unit 122. In either case, the location of the subscriber unit 122 and the excess path loss can be estimated from an inbound message transmission as follows. When a portable subscriber unit 122 generates an inbound message, it is preferably received 808 by several base receivers 117 in the vicinity of the portable subscriber unit 122. The receiving base receivers 117 measure and report to the controller 112 the RSSI value measured during the inbound response. The controller 112 examines the RSSI values and determines therefrom the relative distances between the portable subscriber unit 122 and the base receivers 117, using well-known techniques. From the respective locations of the base receivers 117 and the relative distances, the controller 112 determines an estimate of the location of the portable subscriber unit 122, also using well-known techniques. From the estimate of the location of the portable subscriber unit 122 and the known locations of the base receivers 117, the controller 112 calculates the theoretical free-space path loss between the portable subscriber unit 122 and the receiving base receivers 117. The free space path loss is then compared with the RSSI values reported by the base receivers 117 to determine an estimate of the excess path attenuation to the portable subscriber unit 122.

The controller 112 next sends 810 the address 604 of the portable subscriber unit 122, the outbound message 614, the launch time 608, the location estimate 606 for the portable subscriber unit 122, the excess path attenuation value 612, and the transmission rule designator 610 to the base transmitters 116. The base transmitters 116 each calculate 812 a distance and a direction to the portable subscriber unit 122.

The base transmitters 116 then each modify 814 the predetermined transmission rules 224 based upon the direction and the radiation pattern description 228 to obtain an effective radiation distance. Next, the base transmitters 116 each compute 816 an adjusted distance to the portable subscriber unit 122 according to the estimate of the excess path attenuation, the adjusted distance increasing with increasing excess path loss in a predetermined relationship. Next, the base transmitters each decide independently 818 whether to transmit the outbound message 614, by comparing the effective radiation distance in the direction of the portable subscriber unit 122 with the adjusted distance to the portable subscriber unit 122. This comparison is preferably performed for each outbound message scheduled to launch at the same time, if more than one such message is received. Receipt of more than one message scheduled for launch at the same time occurs when the base transmitters 116 receive multiple outbound messages intended for multiple different portable subscriber units 122 and scheduled for launch at a single, identical time. Such occurrences are necessary for efficient air time utilization and can be quite common during high traffic periods. When this happens, each base transmitter 116 preferably independently discards all but one of the multiple outbound messages, the one of the multiple outbound messages intended for the portable subscriber unit 122 having a largest excess of effective radiation distance over the adjusted distance (corresponding to a highest estimated signal strength at the portable subscriber unit 122). Alternatively, the base transmitter can discard all but the one of the multiple outbound messages intended for the portable subscriber unit 122 having the shortest adjusted distance. In this manner, multiple directed simulcast zones are created, thereby advantageously and automatically providing frequency reuse.

In any case, the base transmitters 116 that have decided to transmit the outbound message 614 then adjust 820 the launch time 608 according to the calculated distance before adjustment, and select a transmission strategy according to the effective radiation distance and relative direction from the base transmitter 116. Preferably, the adjustment to the launch time is done such that the transmissions from the transmitting base transmitters 116 arrive substantially simultaneously at the portable subscriber unit 122, for improved simulcast reception of the outbound message. Examples of transmission strategy adjustments include reducing output power when the effective radiation distance in the direction of the portable subscriber unit 122 is substantially greater than the adjusted distance to the portable subscriber unit 122, or aiming 824 a beam forming antenna in the direction of the portable subscriber unit 122. Optionally, the transmitting base transmitters can reduce the effective radiation distance to approximate the adjusted distance by reducing 822 the output power in accordance with achieving a predetermined estimated field strength at the location of the portable subscriber unit 122. Flow then returns to step 804 to receive another message for a portable subscriber unit 122.

Operation of the wireless messaging system can be modified slightly in accordance with the present invention when a group of portable subscriber units 122 are positioned sufficiently close to one another to be able to communicate with identical ones of the plurality of base transmitters 116. For this special case, the fixed portion 102 determines as the estimate of the location of the portable subscriber unit 122 a medial location central to the group. The controller 112 then sends to the plurality of base transmitters 116 the estimate and a plurality of outbound messages corresponding to the group. This technique advantageously reduces the traffic that must be sent over the communication links 114 and can improve air time efficiency by effectively packing messages together.

Thus, it should be clear from the preceding disclosure that the present invention provides a method and apparatus in a wireless messaging system for facilitating the dynamic creation of directed simulcast zones without adding significantly to the processing burden of the messaging system controllers. The present invention accomplishes this, because the base transmitters decide independently whether to transmit, based upon the distance to the subscriber unit and the launch time of the outbound message. The present invention also advantageously reduces delay spread in the directed simulcast zones by offsetting the timing of the transmissions according to the distance to the subscriber unit, thereby achieving substantially synchronized arrival of the multiple transmissions at the subscriber unit. In addition, the present invention can reduce the required bandwidth of the communication links 114, because the information sent to all base transmitters is identical, rather than being uniquely customized for each base transmitter.

Many modifications and variations of the present invention are possible in light of the above teachings. For example, less than the full set of the disclosed adjustments to the distance can be performed. Calculation of the direction to the portable subscriber unit can be omitted. Many other variations will occur to one of ordinary skill in the art, given the teachings of the preceding disclosure. Thus, it is to be understood that, within the scope of the appended claims, the invention can be practiced other than as described herein above for the exemplary embodiments.

What is claimed is:

1. A method in a wireless messaging system for dynamic creation of simulcast zones optimized for transmission of an outbound message from a plurality of base transmitters to a portable subscriber unit, the method comprising the steps of:

pre-programming the plurality of base transmitters with a corresponding plurality of position coordinates for identifying a plurality of positions at which the plurality of base transmitters are located;

determining, by a fixed portion of the wireless messaging system in response to an inbound message from the portable subscriber unit, an estimate of a location at which the portable subscriber unit is positioned;

sending the outbound message and said estimate from a controller to the plurality of base transmitters;

calculating by the plurality of base transmitters a plurality of distances between the plurality of base transmitters and the portable subscriber unit, based upon the plurality of position coordinates and said estimate; and independently making a decision by a base transmitter of the plurality of base transmitters of whether to transmit the outbound message, based upon a comparison of a predetermined rule with a distance of the plurality of distances, the distance being that between the base transmitter and the portable subscriber unit.

2. The method of claim 1, further comprising the step of adjusting a launch time for the outbound message from the base transmitter in accordance with the distance.

3. The method of claim 1, further comprising the step of adjusting a transmission strategy of the base transmitter in accordance with the distance.

4. The method of claim 1, wherein the pre-programming step comprises the step of pre-programming the plurality of base transmitters with a plurality of predetermined rules, and wherein the sending step comprises the step of sending a rule designator for designating one of the plurality of predetermined rules to be used for making said decision.

5. The method of claim 1, further comprising the steps of:
receiving by the base transmitter at least two outbound messages intended for at least two different portable subscriber units and scheduled for launch at a single, identical time; and
discarding all but one of the at least two outbound messages, the one of the at least two outbound messages intended for the portable subscriber unit positioned such that it has a largest excess of effective radiation distance over the distance between the base transmitter and the portable subscriber unit, said distance adjusted to reflect any excess path loss to the portable subscriber unit.

6. The method of claim 1,
wherein the pre-programming step comprises the step of pre-programming the plurality of base transmitters with a corresponding plurality of radiation pattern descriptions for describing a plurality of relative radiation effectiveness patterns corresponding to the plurality of base transmitters, and
wherein the calculating step comprises the steps of:
calculating a plurality of directions from the plurality of base transmitters to the portable subscriber unit; and
modifying, by a base transmitter, the predetermined rule in accordance with one of the plurality of relative radiation effectiveness patterns corresponding to the base transmitter, as a function of a direction of the plurality of directions, said direction being that from the base transmitter to the portable subscriber unit.

7. The method of claim 1,
wherein the determining step comprises the step of determining an excess path attenuation to the portable subscriber unit, and
wherein the sending step comprises the step of sending the excess path attenuation to the plurality of base transmitters, and
wherein the calculating step comprises the step of adjusting the plurality of distances in accordance with the excess path attenuation.

8. The method of claim 1,
wherein a group of portable subscriber units are positioned sufficiently close to one another to be able to communicate with identical ones of the plurality of base transmitters, and
wherein the determining step comprises the step of determining as the estimate a medial location central to the group, and
wherein the sending step comprises the step of sending to the plurality of base transmitters the estimate and a plurality of outbound messages corresponding to the group.

9. The method of claim 1, further comprising in the base transmitter the step of
adjusting output power in accordance with achieving a predetermined estimated field strength at the location at which the portable subscriber unit is estimated to be positioned.

10. The method of claim 1, further comprising in the base transmitter the steps of:
calculating a direction from the base transmitter to the portable subscriber unit; and
aiming a beam forming antenna in the direction of the portable subscriber unit while transmitting the outbound message.

11. A base transmitter in a wireless messaging system for dynamic creation of simulcast zones optimized for transmission of an outbound message from a plurality of base transmitters to a portable subscriber unit, the base transmitter comprising:
a transmitter for transmitting the outbound message;
a processing system coupled to the transmitter for processing the outbound message; and
a controller interface coupled to the processing system for communicating with a controller,
wherein the processing system comprises a memory for pre-programming the base transmitter with position coordinates for identifying a position at which the base transmitter is located, and
wherein the processing system is programmed to:
cooperate with the controller interface to receive from the controller the outbound message and an estimate of a location at which the portable subscriber unit is positioned;
calculate a distance between the base transmitter and the portable subscriber unit, based upon the position coordinates and said estimate; and
independently make a decision of whether to transmit the outbound message, based upon a comparison of a predetermined rule with the distance.

12. The base transmitter of claim 11, wherein the processing system is further programmed to adjust a launch time for the outbound message in accordance with the distance.

13. The base transmitter of claim 11, wherein the processing system is further programmed to adjust a transmission strategy of the base transmitter in accordance with the distance.

14. The base transmitter of claim 11,
wherein the memory is arranged for pre-programming the base transmitter with a plurality of predetermined rules, and
wherein the processing system is further programmed to cooperate with the controller interface for receiving a rule designator for designating one of the plurality of predetermined rules to be used for making said decision.

15. The base transmitter of claim 11, wherein the processing system is further programmed to:
cooperate with the controller interface for receiving from the controller at least two outbound messages intended for at least two different portable subscriber units and scheduled for launch at a single, identical time; and
discard all but one of the at least two outbound messages, the one of the at least two outbound messages intended for the portable subscriber unit positioned such that it has a largest excess of effective radiation distance over the distance between the base transmitter and the portable subscriber unit, said distance adjusted to reflect any excess path loss to the portable subscriber unit.

16. The base transmitter of claim 11,
wherein the memory is further arranged for pre-programming the base transmitter with a radiation pattern description for describing a relative radiation effectiveness pattern of the base transmitter, and
wherein the processing system is further programmed to:

calculate a direction from the base transmitter to the portable subscriber unit; and modify the predetermined rule in accordance with the relative radiation effectiveness pattern, as a function of the direction.

17. The base transmitter of claim 11, wherein a group of portable subscriber units are positioned sufficiently close to one another to be able to communicate with the base transmitter, and wherein the processing system is further programmed to cooperate with the controller and other ones of the plurality of base transmitters to enable the controller to determine as the estimate a medial location central to the group, and wherein the processing system is further programmed to cooperate with the controller interface to receive the estimate and a plurality of outbound messages corresponding to the group.

18. The base transmitter of claim 11, wherein the processing system is further programmed to cooperate with the transmitter to adjust output power in accordance with achieving a predetermined estimated field strength at the location at which the portable subscriber unit is estimated to be positioned.

19. The base transmitter of claim 11, further comprising a beam forming antenna coupled to the transmitter and coupled to the processing system, wherein the processing system is further programmed to:

calculate a direction from the base transmitter to the portable subscriber unit; and aim a beam forming antenna in the direction of the portable subscriber unit while transmitting the outbound message.

* * * * *